United States Patent [19]
York

[11] Patent Number: 5,727,501
[45] Date of Patent: Mar. 17, 1998

[54] DOG HOUSE APPARATUS

[76] Inventor: Virginia York, P.O. Box 35, Amherst, Va. 24521

[21] Appl. No.: 638,034

[22] Filed: Apr. 26, 1996

[51] Int. Cl.$^6$ ...................................................... A01K 1/00
[52] U.S. Cl. ............................ 119/482; 119/497; 119/501
[58] Field of Search ................................... 119/417, 418, 119/435, 452, 453, 454, 455, 481, 482, 484, 485, 496, 501, 702, 497

[56] References Cited

U.S. PATENT DOCUMENTS

| | | | |
|---|---|---|---|
| D. 257,493 | 11/1980 | Lodrick . | |
| D. 317,665 | 6/1991 | Marshall . | |
| D. 338,985 | 8/1993 | Altman et al. . | |
| 587,551 | 8/1897 | Hoff | 119/494 |
| 3,091,221 | 5/1963 | Worm | 119/484 |
| 3,147,736 | 9/1964 | Daniel | 119/482 |
| 3,172,392 | 3/1965 | Schultz | 119/482 |
| 3,308,789 | 3/1967 | Artig | 119/482 |
| 4,111,157 | 9/1978 | Haugen | 119/497 |
| 4,161,924 | 7/1979 | Welker | 119/482 |
| 4,195,593 | 4/1980 | Dunn . | |
| 4,372,251 | 2/1983 | Keith | 119/501 |
| 4,696,257 | 9/1987 | Neary et al. | 119/501 |
| 4,802,443 | 2/1989 | Denmark | 119/482 |
| 5,050,536 | 9/1991 | Baker | 119/702 |
| 5,072,694 | 12/1991 | Haynes et al. | 119/482 |
| 5,115,767 | 5/1992 | West et al. . | |
| 5,361,725 | 11/1994 | Baillie et al. | 119/482 |
| 5,575,239 | 11/1996 | Bradburn | 119/484 |

FOREIGN PATENT DOCUMENTS 6935 of 1911 United Kingdom ................... 119/482

OTHER PUBLICATIONS

Quonset Hut for your Dog, Popular Mechanics, Aug. 1946.

*Primary Examiner*—Paul J. Hirsch

[57] ABSTRACT

A dog house apparatus includes a four-cornered base unit, a plurality of walls supported by the base unit, and a roof supported by the walls. An entrance opening is located in one of the walls. The entrance opening includes a bottommost aperture portion, a far lateral aperture portion, a topmost aperture portion, and a near lateral aperture portion. The wall which includes the entrance opening includes a near wall half and a far wall half. The entrance opening is entirely included in the near wall half. The bottommost aperture portion of the entrance opening is spaced above the base unit by a vertical offset distance. An overhead entrance cover is connected to the entrance-including wall at a location on the wall above the topmost aperture portion of the entrance opening. The overhead entrance cover slopes downward and away from the entrance opening. A pair of lateral entrance covers are connected to the entrance-containing wall adjacent to the entrance opening. The base unit includes a plurality of wall connectors. Each of the walls includes one or more base connectors which are selectively engageable with and disengageable from the wall connectors. A quantity of floor covering material can be placed on top of the base unit, and the floor covering material has a maximum floor covering thickness which is smaller than the vertical offset distance of the entrance opening from the base unit. The walls slope away from the roof towards the base unit.

14 Claims, 3 Drawing Sheets

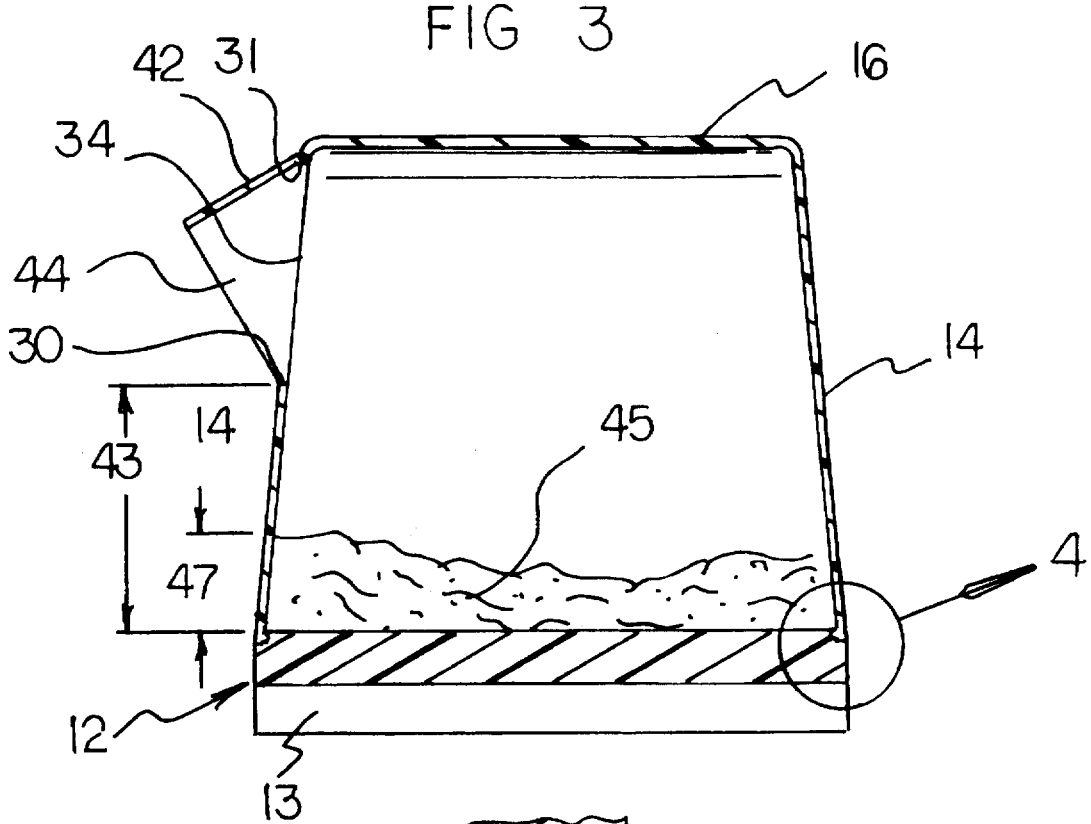
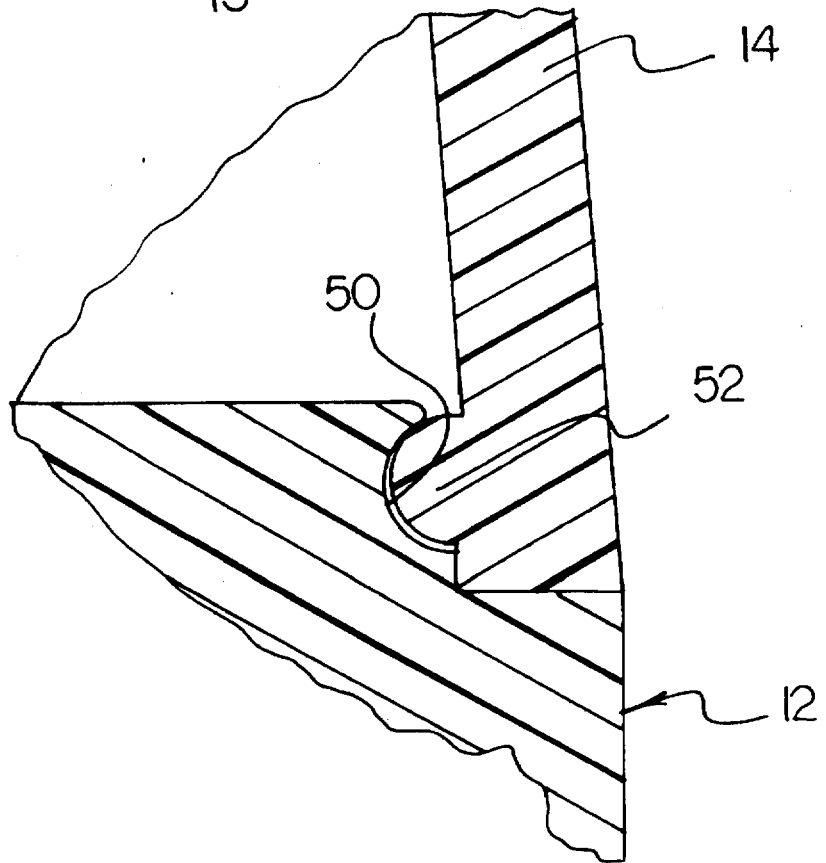

DOG HOUSE APPARATUS

BACKGROUND OF THE INVENTION

1. Field of the Invention

The present invention relates generally to devices for housing animals and, more particularly, to independent housing structures often referred to as dog houses.

2. Description of the Prior Art

Types of housing for animals run a wide gamut. For example, in some zoos, animals may be housed in an environment that simulates an animal's natural habitat. On the other hand, for some household pets, the pets share the same housing that their human owners share. Between the two housing alternatives mentioned above, animals may be housed in independent housing structures often referred as dog houses. It is understood herein that the term "dog house" refers to housing structures occupied by any animal, whether the animal is a dog or another animal.

Throughout the years, a number of innovations have been developed relating to dog houses, and the following U.S. patents are representative of some of those innovations: U.S. Pat. No. 4,195,593, Des. 257,493, Des. 317,665, and Des. 338,985. More specifically, U.S. Pat. No. 4,195,593 discloses a portable dog house that has roof, wall, and floor portions that are hinged with respect to one another so that the structure can be collapsed for ease in carrying the structure. Although the major structural components can be moved with respect to one another, the hinged connections prevent easy separation of the components from one another. However, to provide efficient cleaning of a dog house, it would be desirable to be able to readily separate major structural components from one another so that the interior of the dog house can be readily cleaned.

U.S. Pat. No. Des. 257,493 discloses a dog house that is substantially hemispherically shaped. As such, the interior of the dog house does not provided right-angled corners in which an animal can move into. A right-angle corner can provide an animal a feeling of security and comfort, and, accordingly, it would be desirable if a dog house had right-angled corners for the animal.

U.S. Pat. No. Des. 317,665 also discloses a hemispherically shaped dog house. Moreover, the entrance to the dog house is at essentially floor or ground level. Often a dog house contains loose bedding material, such as saw dust, that is placed inside the dog house in a relatively thick layer which may be considerably above floor or ground level. When such is the case, some loose bedding material may inadvertently be kicked out of the dog house when the animal exits therefrom. In this respect, it would be desirable if a dog house were provided with an entrance which has a bottom portion which is elevated above a level of loose bedding material contained within the dog house.

U.S. Pat. No. Des. 338,985 discloses an insulated dog house that has right-angled corners and that has an entrance located midway between opposite walls. Because the entrance is located midway between opposite walls, the right-angled corners that are distal to the entrance are the same distance from the entrance and are shielded from the entrance equally. Similarly, the right-angled corners that are proximal to the entrance are the same distance from the entrance and are shielded from the entrance equally. As a result, no one corner is most distant from the entrance, and no one corner is most shielded from the entrance. It would be desirable, however, to provide an animal with a dog house in which one corner is most distant from the entrance and in which one corner is most shielded from the entrance. When such would be the case, each corner in the dog house would have its own unique combination of distance and shielding aspects with respect to the entrance, and no two corners would have the same combination of distance and shielding aspects.

Still other features would be desirable in a dog house apparatus. It would be desirable if the dog house were made of insulating material so that the interior of the dog house would be warmer in winter and cooler in summer. An entrance to a dog house is the entry area for rain, wind, and snow, as well as for the animal into the dog house. To reduce the entrance of rain, wind, and snow into the interior of the dog house, it would be desirable if the dog house entrance were provided with an overhead entrance cover.

Thus, while the foregoing body of prior art indicates it to be well known to use dog houses, the prior art described above does not teach or suggest a dog house apparatus which has the following combination of desirable features: (1) has major structural components that can be readily separated from one another so that the interior of the dog house can be readily cleaned; (2) has right-angled corners for the animal to occupy; (3) has an entrance which has a bottom portion which is elevated above a level of loose bedding material contained within the dog house apparatus; (4) provides a dog house in which one corner is most distal to the entrance and in which one corner is most shielded from the entrance; (5) is made of insulating material so that the interior of the dog house would be warmer in winter and cooler in summer; and (6) provides an overhead cover for the entrance. The foregoing desired characteristics are provided by the unique dog house apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides an animal house, e.g. dog house, apparatus which includes a base unit, a plurality of walls supported by the base unit, and a roof supported by the walls. An entrance opening is located in one of the walls. The entrance opening includes a bottommost aperture portion, a far lateral aperture portion, a topmost aperture portion, and a near lateral aperture portion. The wall which includes the entrance opening includes a near wall half, a far wall half, a bottommost wall edge, a far lateral wall edge, and a near lateral wall edge. The entrance opening is entirely included in the near wall half. The bottommost aperture portion of the entrance opening is spaced above the base unit by a vertical offset distance. In the preferred embodiment, the base unit includes four corners. Also, the base unit includes leg portions.

An overhead entrance cover is connected to the wall which includes the entrance opening at a location on the wall above the topmost aperture portion of the entrance opening. The overhead entrance cover slopes downward and away from the entrance opening. A pair of lateral entrance covers are connected to the wall which includes the entrance opening. One of the pair of lateral entrance covers is connected to the wall adjacent to the near lateral aperture portion, and the other of the pair of lateral entrance covers is connected to the wall adjacent to the far lateral aperture portion. The lateral entrance covers include top edges connected to the overhead entrance cover. The lateral entrance covers and the overhead entrance cover can be formed as a unified structure.

The base unit includes a plurality of wall connectors. Each of the walls includes one or more base connectors which are selectively engageable with and disengageable from the wall connectors. The wall connectors can include concave receivers, and the base connectors can include convex projections which are complementary to the concave receivers. The concave receivers and the convex projections can together constitute snap connection means.

A quantity of floor covering material can be placed on top of the base unit, wherein the floor covering material has a maximum floor covering thickness. The vertical offset distance of the entrance opening from the base unit is greater than the maximum floor covering thickness.

The walls and the roof are combined into a unified wall/roof unit. Similarly, the unified wall/roof unit, the overhead entrance cover, and the lateral entrance covers can be provided as a unified unit.

The base unit includes a base length and a base width. The roof includes a roof length and a roof width. The base length can be greater than the roof length, and the base width can be greater than the roof width. In this way, the walls slope away from the roof towards the base unit.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved dog house apparatus which has all of the advantages of the prior art and none of the disadvantages.

It is another object of the present invention to provide a new and improved dog house apparatus which may be easily and efficiently manufactured and marketed.

It is a further object of the present invention to provide a new and improved dog house apparatus which is of durable and reliable construction.

An even further object of the present invention is to provide a new and improved dog house apparatus which is susceptible of a low cost of manufacture with regard to both materials and labor, and which accordingly is then susceptible of low prices of sale to the consuming public, thereby making such dog house apparatus available to the buying public.

Still yet a further object of the present invention is to provide a new and improved dog house apparatus which has major structural components that can be readily separated from one another so that the interior of the dog house can be readily cleaned.

Still another object of the present invention is to provide a new and improved dog house apparatus that has right-angled corners for the animal to occupy.

Yet another object of the present invention is to provide a new and improved dog house apparatus which has an entrance which has a bottom portion which is elevated above a level of loose bedding material contained within the dog house apparatus.

Even another object of the present invention is to provide a new and improved dog house apparatus that provides a dog house in which one corner is most distal to the entrance and in which one corner is most shielded from the entrance.

Still a further object of the present invention is to provide a new and improved dog house apparatus which is made of insulating material so that the interior of the dog house would be warmer in winter and cooler in summer.

Yet another object of the present invention is to provide a new and improved dog house apparatus that provides an overhead cover for the entrance.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 3 is a cross-sectional view of the embodiment of the dog house apparatus of FIG. 2 taken along line 3—3 thereof.

FIG. 4 is an enlarged partial cross-sectional view of the portion of the embodiment of the invention shown in FIG. 3 contained within circled region 4 of FIG. 3.

DESCRIPTION OF THE PREFERRED EMBODIMENT

With reference to the drawings, a new and improved dog house apparatus embodying the principles and concepts of the present invention will be described.

Figure 1:
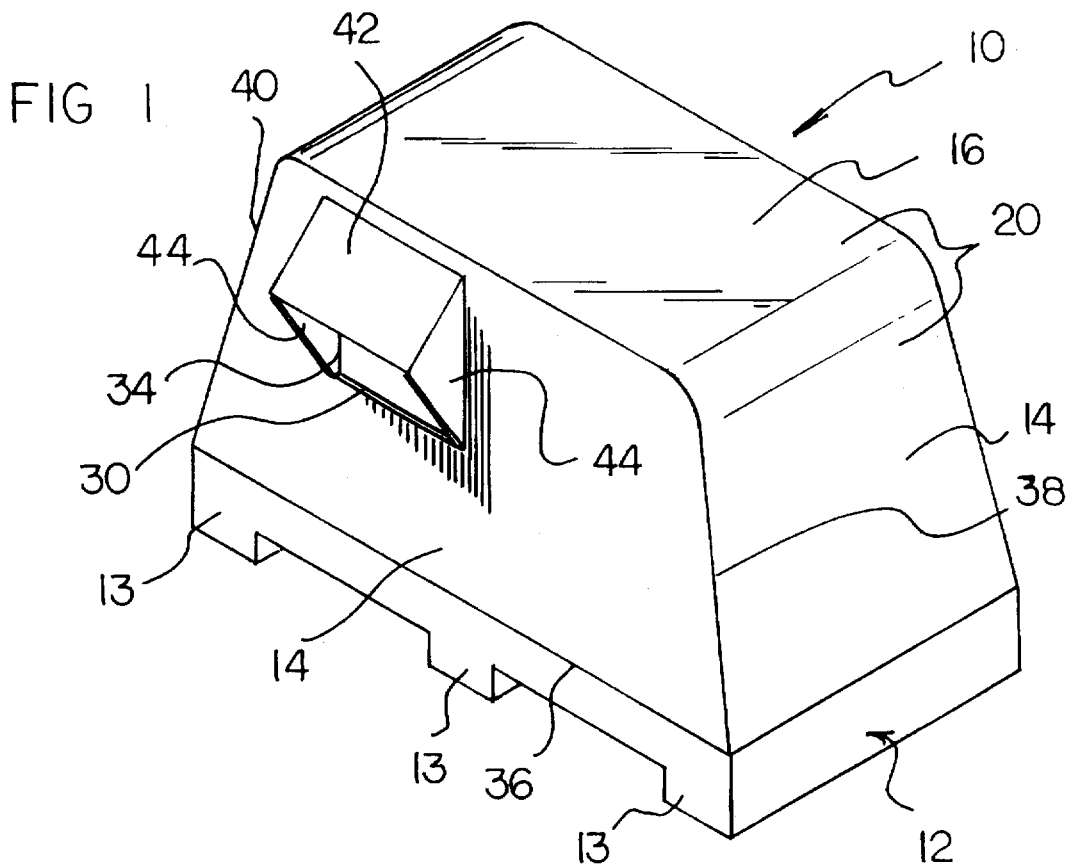
FIG. 1 is a perspective view showing a preferred embodiment of the dog house apparatus of the invention.
Figure 2:
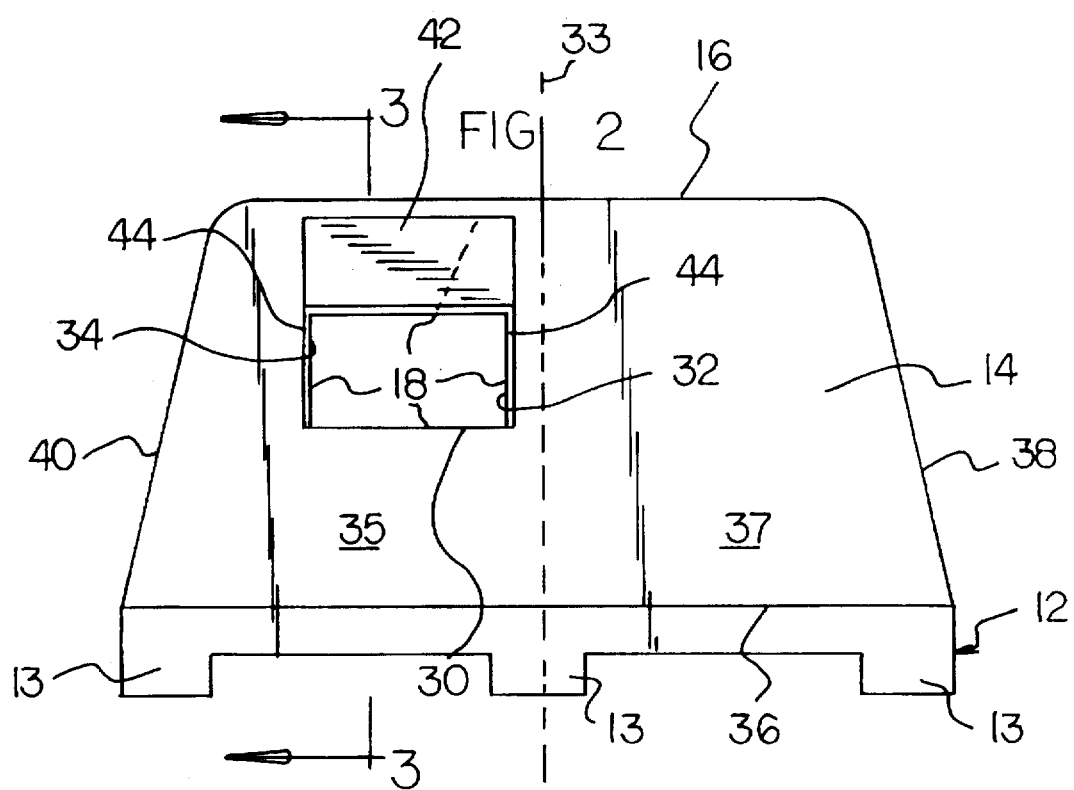
FIG. 2 is a front view of the embodiment of the dog house apparatus shown in FIG. 1.
Figure 5:
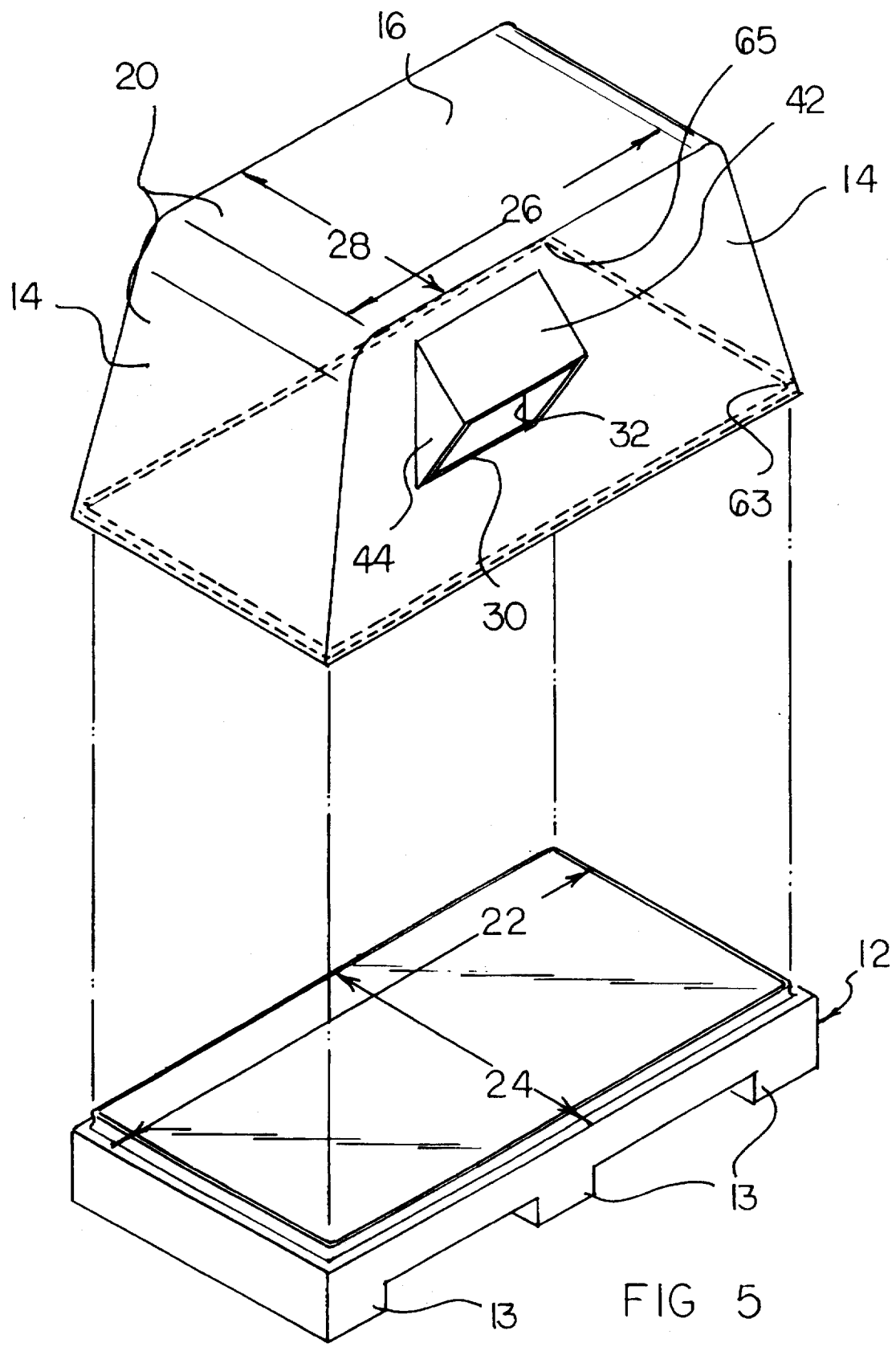
FIG. 5 is an exploded perspective of the embodiment of the invention shown in FIG. 1.

Turning to FIGS. 1–5, there is shown an exemplary embodiment of the animal house apparatus of the invention generally designated by reference numeral 10. In its preferred form, the animal house apparatus 10 includes a base unit 12, a plurality of walls 14 supported by the base unit 12, and a roof 16 supported by the walls 14. An entrance opening 18 is located in one of the walls 14. The entrance opening 18 includes a bottommost aperture portion 30, a far lateral aperture portion 32, a topmost aperture portion 31, and a near lateral aperture portion 34. The wall 14 which includes the entrance opening 18 includes a near wall half 35, a far wall half 37, a bottommost wall edge 36, a far lateral wall edge 38, and a near lateral wall edge 40. The entrance opening 18 is entirely included in the near wall half 35. The bottommost aperture portion 30 of the entrance opening 18 is spaced above the base unit 12 by a vertical offset distance 43. It is noted that a medial line 33 bisects the walls 14 containing the entrance opening 18 into the near wall half 35 and the far wall half 37. In the preferred embodiment, the base unit 12 includes four corners. Also, the base unit 12 includes leg portions 13. Preferably, and as shown in FIGS. 3, 4 and 5, the base unit 12 comprises a substantially flat planar member (not labeled) having a single, imperforate planar upper surface and an outer peripheral edge. The planar upper surface of the planar member extends into contiguous and unobstructed communication with the outer peripheral edge to allow liquids to easily drain from the upper surface of the planar member after cleaning.

An overhead entrance cover 42 is connected to the wall 14 which includes the entrance opening 18 at a location on the wall 14 above the topmost aperture portion 31 of the entrance opening 18. The overhead entrance cover 42 slopes downward and away from the entrance opening 18. A pair of lateral entrance covers 44 are connected to the wall 14 which includes the entrance opening 18. One of the pair of lateral entrance covers 44 is connected to the wall 14 adjacent to the near lateral aperture portion 34, and the other of the pair of lateral entrance covers 44 is connected to the wall 14 adjacent to the far lateral aperture portion 32. The lateral entrance covers 44 include top edges connected to the overhead entrance cover 42. The lateral entrance covers 44 and the overhead entrance cover 42 can be formed as a unified structure.

The base unit 12 includes a plurality of wall connectors. Each of the walls 14 includes one or more base connectors which are selectively engageable with and disengageable from the wall connectors. The wall connectors can include concave receivers 50, and the base connectors can include convex projections 52 which are complementary to the concave receivers 50. The concave receivers 50 and the convex projections 52 can together constitute snap connection means. The wall connectors and the base connectors can be implemented in a variety of other suitable ways. For example, the unified wall/roof unit 20 can clip onto the base unit 12.

A quantity of floor covering material 45 can be placed on top of the base unit 12, wherein the floor covering material 45 has a maximum floor covering thickness 47. The vertical offset distance 43 of the entrance opening 18 from the base unit 12 is greater than the maximum floor covering thickness 47.

The walls 14 and the roof 16 are combined into a unified wall/roof unit 20. Similarly, the unified wall/roof unit 20, the overhead entrance cover 42, and the lateral entrance covers 44 can be provided as a unified unit.

The base unit 12 includes a base length 22 and a base width 24. The roof 16 includes a roof length 26 and a roof width 28. The base length 22 can be greater than the roof length 26, and the base width 24 can be greater than the roof width 28. As a result, the walls 14 slope inward to the roof 16 from the base unit 12. Stated somewhat differently, the walls 14 slope outward to the base unit 12 from the roof 16.

In storing and transporting the animal house apparatus 10 of the invention, the base unit 12 can be partially inserted in the unified wall/roof unit 20, and the unified wall/roof unit 20 can be carried. To use the dog house apparatus 10, the base unit 12 is placed on a floor, the ground, or other horizontal surface. Then, the unified wall/roof unit 20 is lowered onto the base unit 12 so that the convex projections 52 on the walls 14 of the unified wall/roof unit 20 snap into the concave receivers 50 on the base unit 12. A quantity of floor covering material 45, e.g. sawdust, such as shown in FIG. 3, can be moved through the entrance opening 18 and fall on the base unit 12. As shown in FIG. 3, the floor covering material 45 has a maximum floor covering thickness 47. The maximum floor covering thickness 47 is less than the vertical offset distance 43 of the bottommost aperture portion 30 from the base unit 12. Therefore, when an animal, such as a dog, enters into the unified wall/roof unit 20, there will be only a small tendency for any of the floor covering material 45 to be kicked out from the entrance opening 18.

The dog enters the dog house apparatus 10 to be supported by the base unit 12 and to be protected by the unified wall/roof unit 20, by the overhead entrance cover 42, and by the lateral entrance covers 44. Each corner inside the unified wall/roof unit 20 is at a different distance from the entrance opening 18. Moreover, each corner inside the unified wall/roof unit 20 is shielded to a different degree from the entrance opening 18. Corner 63 shown in FIG. 5 is shielded most from the entrance opening 18. Therefore, if the dog snuggles into corner 63, the dog would be most protected from wind and rain that might blow into the interior of the unified wall/roof unit 20. Corner 65 is farthest away from the entrance opening 18.

To clean the interior of the dog house apparatus 10 of the invention, the convex projections 52 on the walls 14 are unsnapped from the concave receivers 50 on the base unit 12. Then, the unified wall/roof unit 20 is lifted off of the base unit 12. In this way, the entire upper surface of the base unit 12 can be swept, brushed, or washed. To clean the unified wall/roof unit 20, the unified wall/roof unit 20 can be turned upside down and scrubbed and washed. Each of the base unit 12 and the unified wall/roof unit 20 can be towel dried or air dried and then easily reassembled as described above.

The base unit 12, the unified wall/roof unit 20, the overhead entrance cover 42, and the lateral entrance covers 44 of the dog house apparatus of the invention can be made from inexpensive and durable molded or extruded plastic materials such as polyethylene. The unified wall/roof unit 20 can be sufficiently thick to provide both structural integrity and insulative properties. In this way, the dog house apparatus 10 of the invention can be warm in winter and cool in summer.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved dog house apparatus that is low in cost, relatively simple in design and operation, and which has major structural components that can be readily separated from one another so that the interior of the dog house can be readily cleaned. With the invention, a dog house apparatus is provided which has right-angled corners for the animal to occupy. With the invention, a dog house apparatus is provided which has an entrance which has a bottom portion which is elevated above a level of loose bedding material contained within the dog house apparatus. With the invention, a dog house apparatus provides a dog house in which one corner is most distal to the entrance and in which one corner is most shielded from the entrance. With the invention, a dog house apparatus is provided which is made of insulating material so that the interior of the dog house would be warmer in winter and cooler in summer. With the invention, a dog house apparatus provides an overhead cover for the entrance.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. An animal house apparatus, comprising:
   a base unit, said base unit comprising a substantially flat planar member having a single, imperforate planar upper surface and an outer peripheral edge,
   a plurality of walls removably coupled to said outer peripheral edge of said planar member of said base unit so as to be supported by said base unit,
   a roof supported by said walls, and
   an entrance opening located in one of said walls,
   wherein said planar upper surface of said base unit extends into contiguous and unobstructed communication with said outer peripheral edge when said plurality of walls are de-coupled from said base unit,
   wherein said entrance opening includes a bottommost aperture portion, a far lateral aperture portion, a topmost aperture portion, and a near lateral aperture portion,
   wherein said wall which includes said entrance opening includes a near wall half, a far wall half, a bottommost wall edge, a far lateral wall edge, and a near lateral wall edge,
   wherein said entrance opening is entirely included in said near wall half of said wall which includes said entrance opening, and
   wherein said bottommost aperture portion is spaced above said base unit by a vertical offset distance.

2. The apparatus of claim 1 wherein said base unit includes four corners.

3. The apparatus of claim 1 wherein said base unit includes leg portions.

4. The apparatus of claim 1, further including:
   an overhead entrance cover connected to said wall which includes said entrance opening at a location on said wall above said topmost aperture portion of said entrance opening.

5. The apparatus of claim 4 wherein said overhead entrance cover slopes downward and away from said entrance opening.

6. The apparatus of claim 4, further including:
   a pair of lateral entrance covers connected to said wall which includes said entrance opening, wherein one of said pair of lateral entrance covers is connected to said wall adjacent to said near lateral aperture portion, and wherein the other of said pair of lateral entrance covers is connected to said wall adjacent to said far lateral aperture portion.

7. The apparatus of claim 6 wherein said lateral entrance covers include top edges connected to said overhead entrance cover.

8. The apparatus of claim 7 wherein said lateral entrance covers and said overhead entrance cover are formed as a unified structure.

9. The apparatus of claim 1 wherein:
   said base unit includes a plurality of wall connectors, and
   each of said walls includes one or more base connectors which are selectively engageable with and disengageable from said wall connectors.

10. The apparatus of claim 9 wherein:
    said wall connectors include concave receivers, and
    said base connectors include convex projections which are complementary to said concave receivers.

11. The apparatus of claim 10 wherein said concave receivers and said convex projections together constitute snap connection means.

12. The apparatus of claim 1, further including a quantity of floor covering material placed on top of said base unit, wherein:
    floor covering material has a maximum floor covering thickness, and
    said vertical offset distance is greater than said maximum floor covering thickness.

13. The apparatus of claim 1 wherein said walls and said roof are combined into a unified wall/roof unit.

14. The apparatus of claim 1 wherein:
    said base unit includes a base length and a base width,
    said roof includes a roof length and a roof width,
    said base length is greater than said roof length, and
    said base width is greater than said roof width.

* * * * *